United States Patent
Nobel

(10) Patent No.: US 10,635,451 B2
(45) Date of Patent: Apr. 28, 2020

(54) MASS STORAGE MEDIUM HAVING AN OPERATING SYSTEM BUT NOT A PARTITION TABLE PRE-INSTALLED

(71) Applicant: Hewlett-Packard Development Company, L.P., Houston, TX (US)

(72) Inventor: Gary Mark Nobel, Poway, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 217 days.

(21) Appl. No.: 15/259,263

(22) Filed: Sep. 8, 2016

(65) Prior Publication Data

US 2018/0067751 A1  Mar. 8, 2018

(51) Int. Cl.
| | |
|---|---|
| G06F 9/4401 | (2018.01) |
| G06F 8/61 | (2018.01) |
| G06F 3/06 | (2006.01) |
| G06F 13/10 | (2006.01) |

(52) U.S. Cl.
CPC .......... *G06F 9/4406* (2013.01); *G06F 3/0626* (2013.01); *G06F 3/0632* (2013.01); *G06F 3/0673* (2013.01); *G06F 8/61* (2013.01); *G06F 9/4401* (2013.01); *G06F 13/10* (2013.01)

(58) Field of Classification Search
CPC .................................................. G06F 9/4406
See application file for complete search history.

(56) References Cited

U.S. PATENT DOCUMENTS

| | | | | |
|---|---|---|---|---|
| 5,974,567 A | * | 10/1999 | Dickson, Jr. ........ | G06F 11/2284 713/1 |
| 6,000,023 A | * | 12/1999 | Jeon ...................... | G06F 3/0607 711/173 |
| 6,351,850 B1 | * | 2/2002 | van Gilluwe ............ | G06F 8/61 707/999.202 |
| 6,385,721 B1 | * | 5/2002 | Puckette ............... | G06F 9/4408 713/2 |
| 7,761,867 B2 | | 7/2010 | Goetz | |
| 2002/0129217 A1 | | 9/2002 | Nichols | |
| 2003/0191930 A1 | * | 10/2003 | Viljoen ..................... | G06F 8/65 713/1 |
| 2007/0028230 A1 | * | 2/2007 | Goetz ....................... | G06F 8/61 717/174 |
| 2012/0054734 A1 | | 3/2012 | Andrews et al. | |

(Continued)

FOREIGN PATENT DOCUMENTS

| | | |
|---|---|---|
| CN | 103744694 | 4/2014 |
| CN | 105045621 | 11/2015 |
| WO | WO-2014082583 | 6/2014 |

OTHER PUBLICATIONS

How to Change Size of MTD Partitions at Runtime, 2004, http://www.infradead.org/pipermail/linux-mtd/2004-September/010355.html.

*Primary Examiner* — Kim Huynh
*Assistant Examiner* — Joshua Neveln
(74) *Attorney, Agent, or Firm* — HPInc. Patent Department

(57) ABSTRACT

In one example, a computing device including a mass storage medium. The mass storage medium has a pre-installed operating system but no pre-installed partition table. The mass storage medium has pre-installed boot software to generate and store a partition table on the mass storage medium. The partition table is usable by the operating system to access information on the mass storage medium.

23 Claims, 7 Drawing Sheets

(56) References Cited

U.S. PATENT DOCUMENTS

2013/0141762 A1* 6/2013 Ishikawa ................ G06K 15/00
                                                        358/1.16
2015/0095519 A1* 4/2015 Hu ........................ G06F 9/4411
                                                         710/13

* cited by examiner

| PARTITION TYPE | PARTITION SIZE | PARTITION START BLOCK LOCATION | ORDER | |
|---|---|---|---|---|
| PRI P/T | 1 MB | 0 | 1 | 502 |
| BOOT SW | 20 MB | 1 MB | 2 | 504 |
| OS IMG | 3000 MB | 21 MB | 3 | 506 |
| RO FS | 3000 MB | 3021 MB | 4 | 508 |
| RW FS | VARIABLE | 6021 MB | 5 | 510 |
| SEC P/T | 1 MB | VARIABLE | 6 | 512 |

FIG. 5

MASS STORAGE MEDIUM HAVING AN OPERATING SYSTEM BUT NOT A PARTITION TABLE PRE-INSTALLED

BACKGROUND

Many mass storage media, such as hard disks and flash memory for example, use a partition table which defines how the blocks and/or sectors of the media are grouped into partitions. Each partition has a particular size and location on the media. During the boot process of a computer communicatively coupled to such a mass storage medium, the computer reads the partition table in order to find the location of the operating system (OS) which is installed on the storage medium. The OS, in turn, reads the partition table to locate and access program and data files stored on the medium.

BRIEF DESCRIPTION OF THE DRAWINGS

FIG. 5 is a schematic representation of example partition information usable to create and write a partition table for a mass storage medium in accordance with an example of the present disclosure.

DETAILED DESCRIPTION

Figure 1:
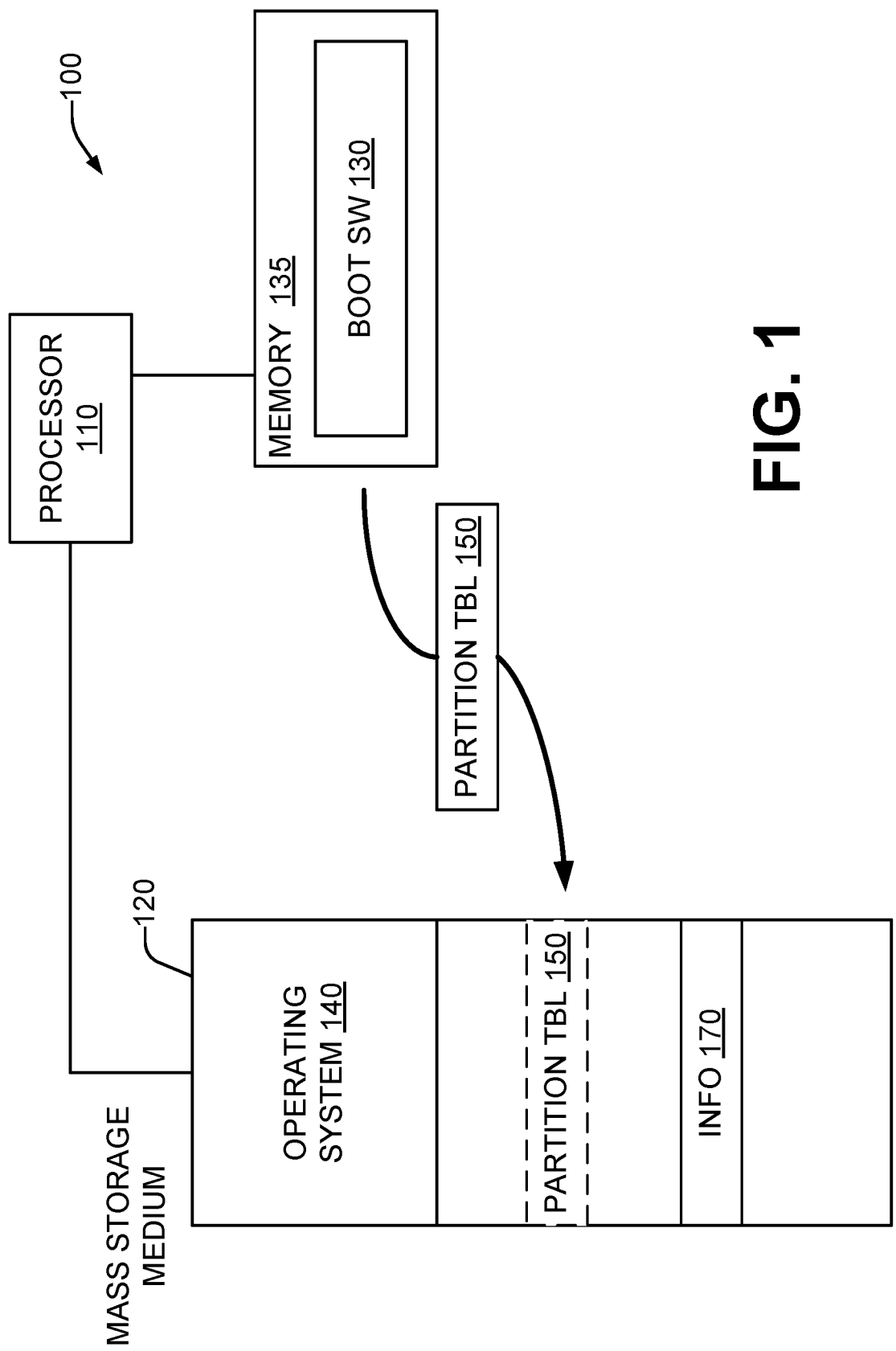
FIG. 1 is a schematic representation of a computing device including a mass storage medium in accordance with an example of the present disclosure.

As computers and products which include embedded computers (which may be collectively referred to as "computing devices") move to a philosophy of more hardware flexibility and customization, it is advantageous for a single set of software to support a range of properties. This capability can be especially advantageous in computer-based products. Such computer-based products can include computer peripherals (such as printers, for example), appliances, and many other products. One type of customization is the size (storage capacity) of an embedded mass storage medium. This medium may be, for example, a hard drive or flash memory drive that can store both a pre-installed operating system for the product, and user-installed programs and/or data. In order to access the various program and data files stored on the medium, the operating system uses a partition table which defines the location and size of the individual partitions into which the mass storage medium is divided.

Consider a computing device with a single mass storage medium in which the medium is of one of a number of sizes. For example, the medium may have a storage capacity of 8 GB, 16 GB, 128 GB, and 256 GB. It would be advantageous for the manufacturer to have a single software image of the operating system (and other manufacturer-supplied software) which could be pre-installed on any of the different storage capacity media. However, this has not been possible previously, because the software image also includes the partition table which allows the operating system to execute properly. If a single software image were to be pre-installed onto different size mass storage media, the software image would contain a partition table that is sized for the smallest size supported medium (e.g. 8 GB). In this case, the size of the partition for storing user-installed programs and/or data would correspond to the portion of the 8 GB not used for pre-installed software. If this particular software image were to be installed on a larger mass storage device, the additional memory would be inaccessible to the operating system. In other words, the customer would derive no benefit from the larger mass storage device; e.g. a 128 GB mass storage device would appear to be merely an 8 GB mass storage device. As a result, in order to make use of the larger storage capacity, manufacturers would create, test, inventory, and track a different software image for each particular size mass storage medium (e.g. 8 GB, 16 GB, 128 GB, and 256 GB), and then pre-install on the medium the particular software image which corresponded to that size medium.

One core concept is a computing device which includes a mass storage medium having a pre-installed operating system but no pre-installed partition table. Boot software generates and stores a partition table on the mass storage medium for use by the operating system. The partition table can maximize the size of at least one particular partition on the medium, such as for example a read-write partition usable for storing user-installed programs and/or data, by taking into account the memory capacity of the mass storage device when creating that partition.

In this way, a significant advance in the computer's function is achieved. The partition table is not pre-installed on the mass storage medium that has the operating system, but rather the partition table is created when the computer coupled to the mass storage medium is booted. The created partition table maximizes the size of the partition for user-installed programs and/or data, and is used from then on by the operating system on the mass storage medium.

A significant advance in manufacturing technology is also achieved. A manufacturer can now pre-install the same single software image on mass storage media of different memory capacities. This allows the manufacturer to significantly reduce the number of different software images it maintains down to just one single software image. This, in turn, eliminates the time, effort, and expense that would otherwise be incurred by the manufacturer in creating, testing, inventorying, and tracking a different software image for each particular size mass storage medium that it supports. It also simplifies final assembly by eliminating parts and/or assembly steps, and improves quality by eliminating assembly errors and/or customer failures resulting from use of the wrong software image for a particular size mass storage medium.

Considering now a computing device, and with reference to FIG. 1, a computing device 100 includes a processor 110, a mass storage medium 120 communicatively coupled to the processor 110, and boot software 130. The mass storage medium 120 has a pre-installed operating system 140 but no pre-installed partition table 150. The boot software 130 is in a memory 135 communicatively coupled to the processor 110, and is executable by the processor 110. The boot software 130 generates the partition table 150 and stores the partition table 150 on the mass storage medium 120. The partition table 150 is then usable by the operating system 140 to access information 170 (programs or data) stored on the mass storage medium 120. The contents of the partition table are determined by at least one characteristic of the mass storage medium.

Figure 2:
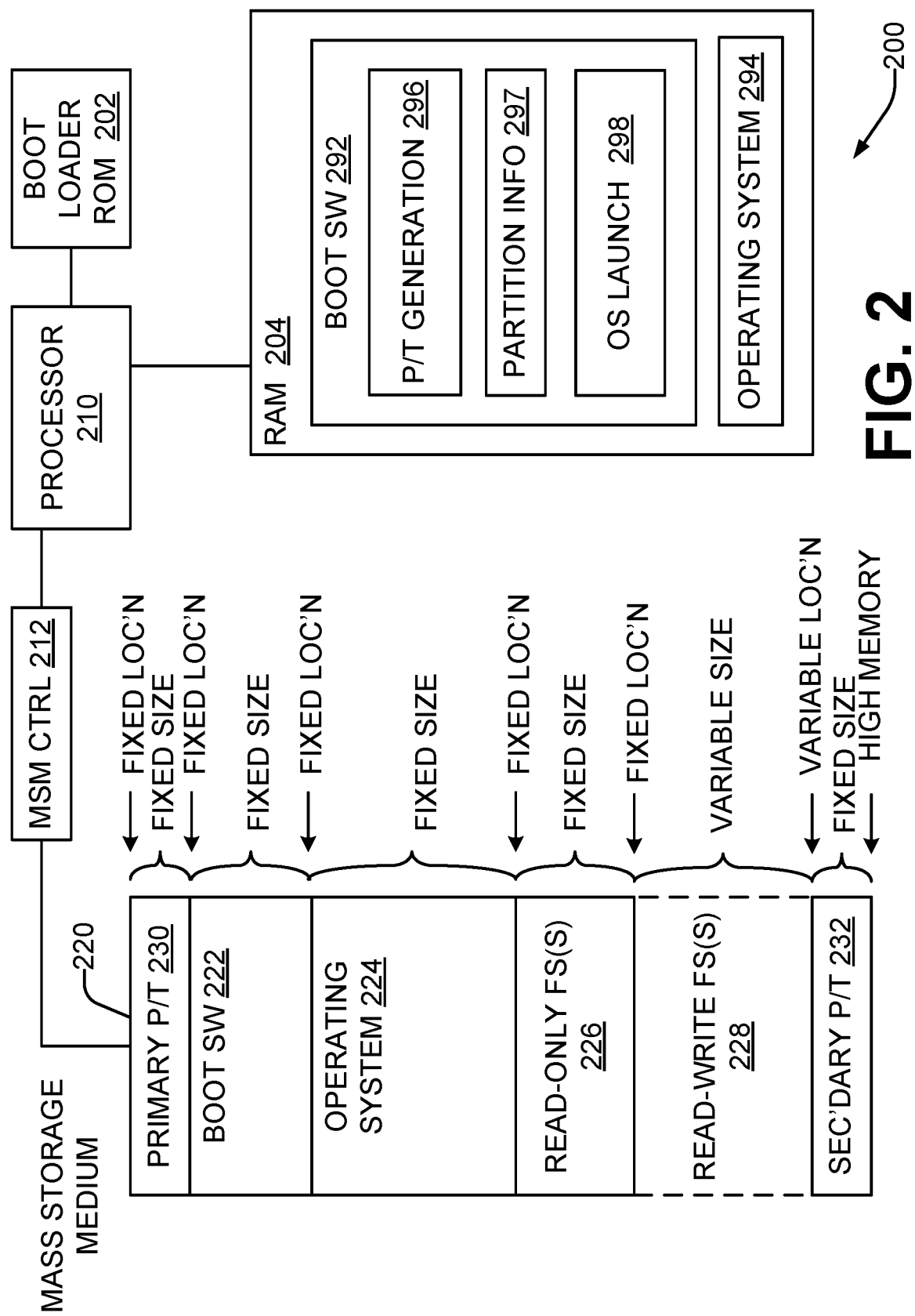
FIG. 2 is a schematic representation of another computing device including a mass storage medium in accordance with an example of the present disclosure.

Considering now another computing device, and with reference to FIG. 2, a computing device 200 includes a processor 210, and a mass storage medium 220 communicatively coupled to the processor 210. In some examples, the mass storage medium 220 and the processor 210 are coupled via a mass storage memory controller 212. The processor 210 is also communicatively coupled to a boot loader ROM 202 and a RAM 204, and can execute software instructions stored in the ROM 202 and/or RAM 204.

The mass storage medium 220 may be any non-transitory medium usable to persistently store computer-readable software (including firmware) executable by the processor 210, and/or computer-readable data accessible by the processor 210. For example, the mass storage medium 220 may be a hard disk drive, a solid-state drive, a flash drive, or another type of drive or memory. In one example, the mass storage device is an eMMC flash memory. In some examples, some portions of the software and/or data may also be writable to the mass storage medium 220 by the processor 210. In some examples, the software and/or data may be stored on the mass storage medium 220 as an "image", which is a specific set of bits that serve some purpose, such as a file system, or a program, for example.

The mass storage medium 220 is divided into partitions. As defined herein and in the appended claims, a "partition" may be broadly understood to mean a contiguous set of blocks and/or sectors on the mass storage medium whose contents have a similar function. The partitions include a boot software partition 222, an operating system partition 224, at least one read-only file system partition 226, at least one read-write file system partition 228, a primary partition table partition 230, and a secondary partition table partition 232. Each partition 222-232 has a size and a location in the mass storage medium 220. Each file system partition 226, 228 includes the structures which describe the files that are in the file system, as well as the files themselves.

The boot software partition 222 stores boot software 292 which is loadable into the RAM 204 during operation to boot the computing device 200 and, in some cases, initialize it as is discussed subsequently. The operating system partition 224 stores operating system software 294 which is loadable into the RAM 204 during operation. The at least one read-only file system partition 224 stores program and/or data files for the computing device 200 which may include, for example, application programs loadable into the RAM 204 during operation which implement the features and functionality of the computing device 200. The at least one read-write file system partition 228 stores program and/or data files added, changed, and/or removed during operation of the computing device 200, either by the user of the computing device 200 and/or automatically by the computing device 200 itself. Two partition table partitions 230, 232 (two exist for redundancy, although a single partition table might exist in other examples) store the partition table used by the operating system 294 to locate, in the mass storage device 220, the different partitions and their content. In other words, the operating system 294 uses the partition table 230, 232 in order to properly access other program and/or data files on the mass storage device 220. In various examples, the operating system 294 is Linux, Windows, or another operating system which uses a partition table to locate the different partitions 222-232 in the mass storage device 220 and access their content.

As supplied by the manufacturer of the computing device 200, and as exists before the computing device 200 has been initialized, the contents of certain partitions may be pre-installed on the mass storage medium 220. In some examples, the contents of the boot software partition 222, the operating system partition 224, and the at least one read-only file system partition 224 are pre-installed.

However, the partition table is not pre-installed in the partitions 230, 232 by the manufacturer, and does not exist before the computing device 200 has been initialized. It is desirable to maximize the size of the at least one read-write file system partition 228 by allocating to it all otherwise-unused memory (sectors/blocks) of the mass storage device 220. But as has been discussed heretofore, pre-installing the partition table would undesirably restrict the size of the at least one read-write file system partition 228 to that of the smallest memory capacity mass storage device 220 supported for the computing device 200, and/or would undesirably cause the manufacturer to create, maintain, and pre-install a different version of mass storage contents for each different size mass storage device 220 supported for the computing device 200.

In light of the above, the size and location of the partitions 222-232 in the mass storage medium 220 may be fixed or variable. In some examples, the size and location may be determined in terms of blocks of the mass storage device 220; for example, a mass storage device 220 with a memory capacity of 8 GB (8096 MB) may have 8096 1 MB blocks. With regard to partition size, all partitions except the at least one read-write file system partition 228 have a fixed, pre-determined size. The size of the boot software partition 222, the operating system partition 224, and the at least one read-only file system partition 226 are determined at least in part by size of the software and the files which they contain. The size of the partition table partitions 230, 232 is determined at least in part by the maximum possible number of partitions of the mass storage medium 220. As explained above, the size of the at least one variable-size partition 228 varies with the memory capacity of the mass storage medium 220.

With regard to location, in some examples the operating system 294 expects at least one of the partition table partitions 230, 232 to begin at a particular predefined location. In one example, by convention, the primary partition table partitions 230 begins at the lowest address block of the mass storage device memory, and the secondary partition table partitions 230, 232 ends at the highest address block of the mass storage device memory. The starting locations of the boot software partition 222, the operating system partition 224, and the at least one read-only file system partition 226 are also disposed at fixed locations, because each has a fixed, predetermined size and are adjacent each other after the primary partition table partition 230. The starting location of the at least one read-write file system partition 228 is also fixed, as it is adjacent the at least one read-only file system partition 226. The starting location of the secondary partition table partition 232 is also fixed, because it has a predetermined size and ends at the highest address block.

In operation, and as described subsequently with reference to FIG. 3, when the computing device 200 is powered on, the processor 210 begins executing the firmware in the boot loader ROM 202. This firmware causes the boot software 292 to be loaded into the RAM 204 from the boot software partition 222. The boot loader ROM firmware knows the fixed location in the mass storage device 220 of the boot software 292, which in independent of the memory capacity of the mass storage medium 220.

The boot software 292 initializes the computing device 200, if the computing device 200 has not been previously initialized. To initialize the computing device 200, the boot software 292 invokes a partition table generation module 296 in the boot software which creates and writes a partition table to the primary partition table partition 230 and to the secondary partition table partition 232. To do so, the module 296 uses predefined partition information 297 which describes at least the type, size, location, and ordering of the partitions. The boot software 292 does not use the partition table in performing its operations.

In some examples, the partition table which is stored in the partition 230 may differ slightly from the partition table stored in the partition 232, although the table entries which locate each partition are at least substantially the same. One example partition table is described subsequently with reference to FIGS. 5A and 7, and a corresponding example of the predefined partition information 297 is described subsequently in greater detail with reference to FIG. 6.

The boot software 292 also includes an OS launch module 298 to load the operating system 294 into the RAM 204 and then execute it. The boot software 292 knows the fixed location in the mass storage device 220 of the operating system 294, which in independent of the memory capacity of the mass storage medium 220. In one example, the OS launch module 298 executes the operating system 294 by transferring execution control to the operating system 294 after it is loaded.

The boot software 292 invokes the partition table generation module 296 the first time the computing device 200 is powered on and the boot software 292 executed. The boot software 292 first checks for the existence of partition tables in at least one of the partition table partitions 230, 232. If no partition table is found, then the partition table generation module 296 is executed in order to create and write the partition table. In one example, this check for a partition table can be done by examining the locations in the mass storage medium that would be occupied by the partition table, which can be determined from the partition information 297, and then looking for a particular pattern in memory which is indicative of a partition table.

If a partition table is found to exist, then execution of the partition table generation module 296 is omitted, and the boot software 292 executes the OS launch module 298. This is how the boot process proceeds in subsequent power cycling events which occur after the computing device 200 is powered on and booted for the first time—in other words, after the computing device 200 is initialized.

In some examples, the initialization of the computing device 200 neither modifies, nor relocates on the mass storage medium 220, any files of the operating system (i.e. file in the operating system partition 224) and/or the read-only file system (i.e. files in the read-only file system partition 226). In some examples, the initialization of the computing device 200 neither resizes nor relocates on the mass storage medium 220 any partitions having pre-installed software (i.e. the boot software partition 222, the operating system partition 224, and the read-only file system partition 226).

While in the particular example computing device 200 the mass storage medium 220 has the particular ordering of partitions 222-232 described and illustrated with reference to FIG. 2, other example computing devices can have more, fewer, or different partitions, and/or a different ordering of partitions within the mass storage medium. The ordering of the partitions 222-232 in FIG. 2 can be advantageous in that relocation of any partitions having pre-installed software is not performed.

Figure 3:
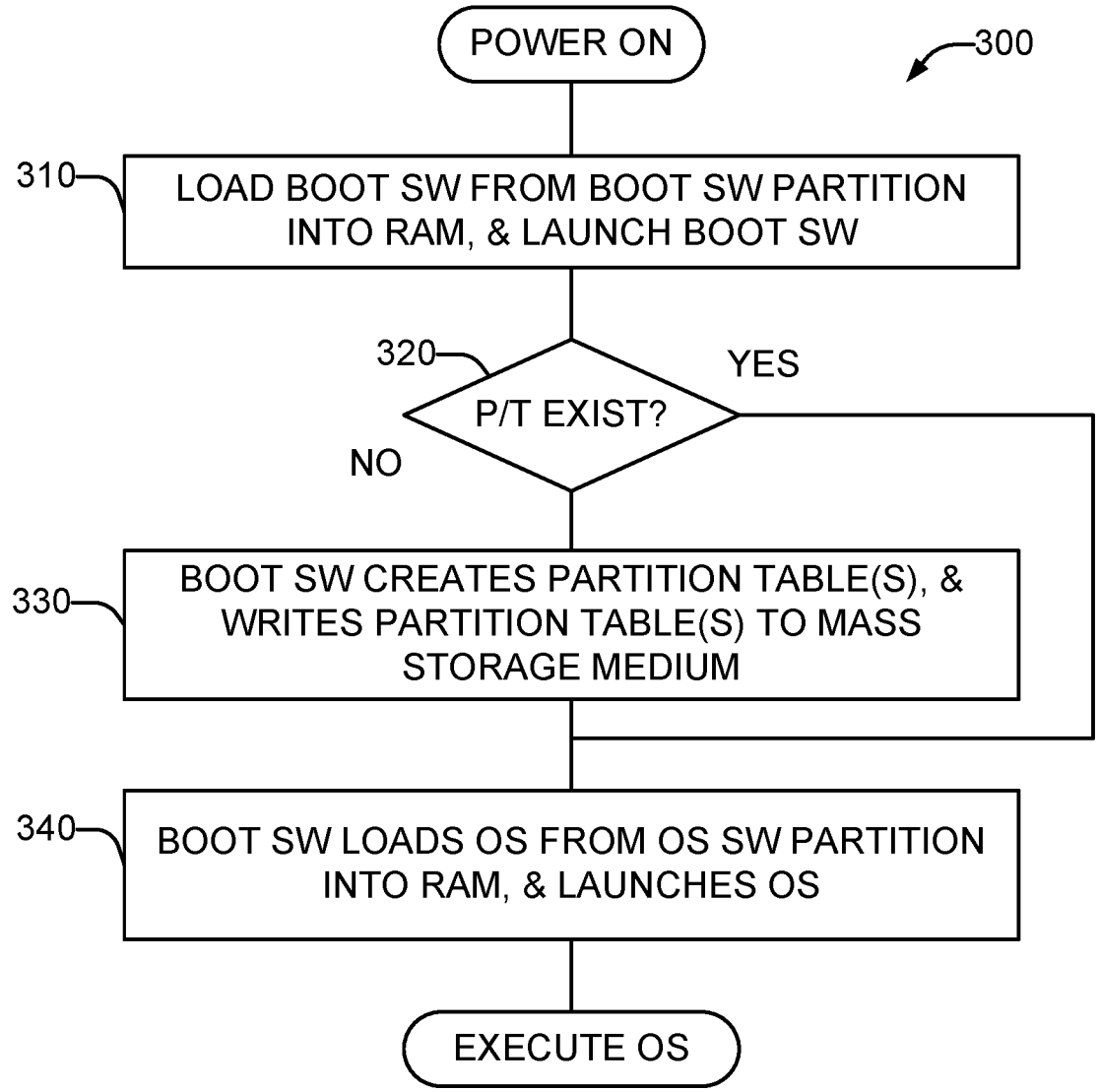
FIG. 3 is a flowchart in accordance with an example of the present disclosure of a method of booting a computer which includes a mass storage medium.

Considering now a method of booting a computing device, and with reference to FIG. 3, a method 300 begins at 310 by loading into RAM boot software from the mass storage medium. The mass storage medium has a pre-installed operating system which is dependent on a partition table for its operation, but does not have a pre-installed partition table usable by the operating system in its operation to access information on the mass storage medium. In some examples, the method 300 begins after the computing device is powered on.

At 320, it is determined whether a partition table exists on the mass storage medium. In one example, this is done by the boot software reading the contents of an area on the mass storage medium where a partition table would be stored if it existed, and analyzing the contents to determine if they correspond to a partition table. If the partition table does not exist ("No" branch of 320), then at 330 the boot software creates at least one partition table based at least in part on a memory capacity of the mass storage medium, and writes (stores) the at least one created partition table to the mass storage medium for use by the operating system to access information (e.g. program and/or data files) stored on the mass storage medium.

At 340, the boot software loads the pre-installed operating system into RAM, and launches execution of the operating system. The computing device subsequently operates under the control of the operating system.

If the partition table does exist ("Yes" branch of 320), then block 330 is omitted and the method proceeds to 340. This indicates that the computing device has previously been initialized to create and store the partition table. This initialization is performed the first time the computing device is booted, and is omitted on subsequent boot operations.

In various examples, the boot software is pre-installed on the mass storage medium in a boot software partition, the operating system software is pre-installed on the mass storage medium in an operating system partition, and each at least one partition table is written to a different partition table partition on the mass storage medium. The creating and writing of the partition table preserves the size, and the location on the mass storage medium, of partitions having pre-installed software.

The boot method 300 is performed by the computing device in a stand-along mode, without the involvement or assistance of any other computing device.

In an alternative example, the boot software is not stored on the mass storage medium but rather is stored in a memory, such as for example a ROM, which is directly accessible to the processor for execution.

Figure 4:
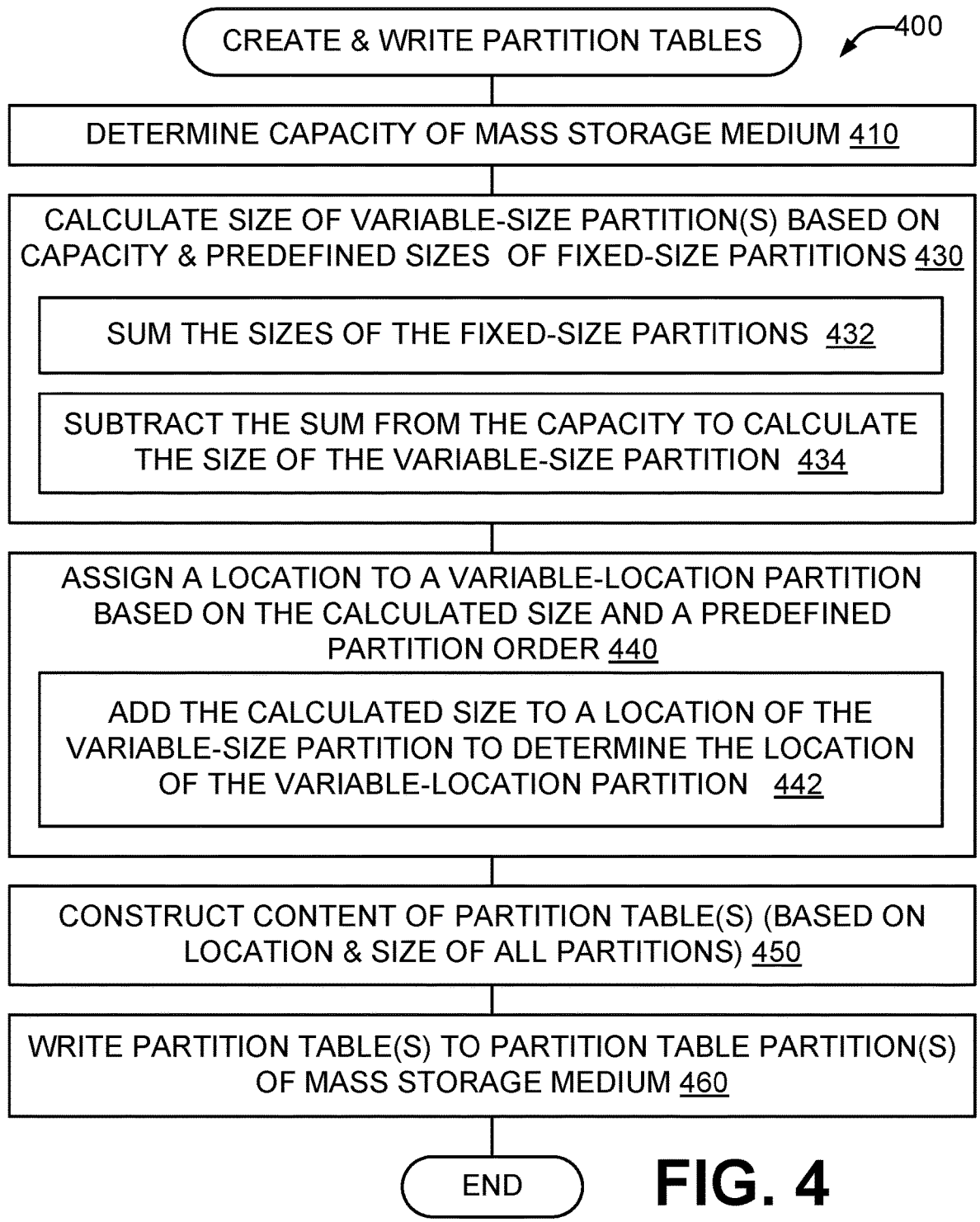
FIG. 4 is a flowchart in accordance with an example of the present disclosure of a method of creating and writing a partition table.

Considering now in greater detail a method of creating and writing a partition table, and with reference to FIG. 4, in some examples a method 400 may correspond to a lower-level method of block 330 (FIG. 3). The method 400 begins at 410 by obtaining a size (memory capacity) of a mass storage medium. At 430, the size of a variable-size partition (or partitions) is calculated, based on the mass storage medium memory capacity and the predefined sizes of the fixed-size partitions. In the computing device 200 of FIG. 2, for example, partitions 222, 224, 226, 230, and 232 (FIG. 2) are fixed-size partitions whose size does not change based on the memory capacity of the mass storage medium, and partition 228 (FIG. 2) is a variable-size partition. At 440, a location on the mass storage medium of a variable-location partition is assigned, based at least in part on the calculated size of the read-write partition and a predefined partition order of the partitions on the mass storage medium. In the computing device 200 of FIG. 2, for example, partition 232 is a variable-location partition. At 450, the content of a partition table (or plural partition tables) is constructed, based on the locations and sizes (predefined or calculated) of all the partitions of the mass storage device. At 460, the partition table (or plural partition tables) is written to a partition table partition (or plural partition table partitions) of the mass storage medium.

In one example, the size of a variable-size partition (or partitions) is calculated by first summing the sizes of the fixed-size partitions of the mass storage medium at 432. At 434, the size of the variable-size partition (or collective size of plural variable-size partitions) is determined by subtracting the sum from the memory capacity of the mass storage medium. In one example, the location of the variable-location partition is calculated by adding, at 442, the calculated size of the variable-size partition to the starting block location of the variable-size partition in order to determine the starting block location of a variable-location partition which follows the variable-size partition in the predefined partition order. The location of any subsequent variable-location partitions in the mass storage medium may be calculated in an analogous manner.

The partition information 297 (FIG. 2) may be used in block 330 of the method 300 (FIG. 3) and/or in the method 400 (FIG. 4) to create and write a partition table for a mass storage medium. Considering now a schematic representation of partition information usable to create and write an example partition table for a mass storage medium, and with reference to FIG. 5, example partition information 500 describes six partitions. Each row (i.e. an entry, or a record) of information 500 describes one partition. For each partition, a partition type, a partition size, a partition starting block location (the address in the memory of the mass storage medium at which the first block of the partition is located), and an order of the partition within the mass storage medium are predefined. The first block begins at address 0 of mass storage memory, and partitions Row 502 defines a primary partition table partition whose size and location are fixed (i.e. independent of the media size). It has a partition size of 1 MB, a starting block location of 0, and is the first partition in the mass storage medium. A 1 MB partition size is used in FIG. 5 for ease of illustration and explanation, but in many other examples the partition size is less than about 2 KB (2048 bytes).

Row 504 defines a boot software partition whose size and location are fixed. It has a partition size of 20 MB, a starting block location of 1 MB, and is the second partition in the mass storage medium.

Row 506 defines an operating system partition whose size and location are fixed. It has a partition size of 3000 MB, a starting block location of 21 MB, and is the third partition in the mass storage medium.

Row 508 defines a read-only file system partition whose size and location are fixed. It has a partition size of 3000 MB, a starting block location of 3021 MB, and is the fourth partition in the mass storage medium.

Row 510 defines a read-write file system partition whose location is fixed, but whose size is variable (i.e. dependent on the media size). It has a variable partition size, a starting block location of 6021 MB, and is the fifth partition in the mass storage medium. A variable partition size indicates that the size of the partition will be determined during initialization based on the memory capacity of the mass storage device.

Row 512 defines a secondary partition table partition whose size is fixed, but whose location is variable (i.e. dependent on the media size). It has a partition size of 1 MB, a variable starting block location, and is the sixth partition in the mass storage medium. A variable starting block location indicates that the location of the partition will be determined during initialization based on the memory capacity of the mass storage device.

The various partition sizes and partition start block locations are defined such that the partitions are adjacent to each other, starting with the primary partition table partition located at the lowest memory address of the mass storage medium. The first partition of one block follows the last partition of the preceding block (or starts at block 0, in the case of the first partition).

In another example where the partition information defines more than one variable-size partition, the partition information 500 may be extended to include additional information that specifies how the memory is allocated among the multiple variable partition size partitions. This information may include, for example, a percentage of memory to be allocated to each variable size partition, a minimum partition size, a combination of these, and/or other allocation parameters.

The partition information 500 is also usable by the boot software 292 (FIG. 2) to locate the operating system partition 224 so that it can load the operating system 294 and transfer execution control to it.

Figure 6:
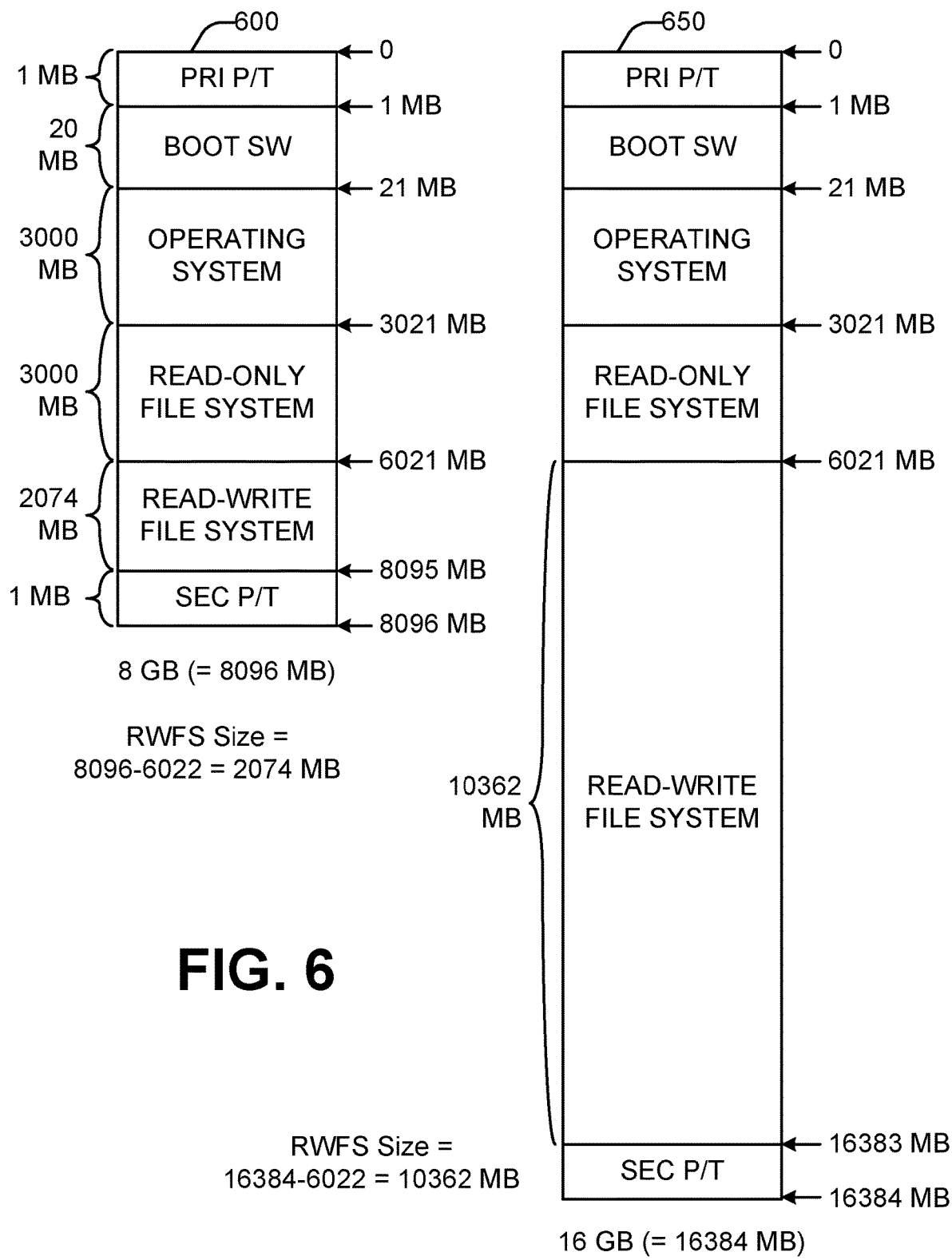
FIG. 6 is a schematic representation of the partitioning of two different size example mass storage media using the partition information of FIG. 5 in accordance with an example of the present disclosure.

Considering now the partitioning of two different size example mass storage media in accordance with the partition table creating method 400 (FIG. 4) and the partition information 500 (FIG. 5), and with reference to FIG. 6, a first mass storage medium 600 has a memory capacity of 8 GB (8096 MB), and a second mass storage medium 650 has a memory capacity of 16 GB (16384 MB). Assume that, in both media 600, 650, the block size is 1 MB; thus the medium 600 has 8096 blocks, and the medium 650 has 16384 blocks.

For the mass storage medium 600, the memory capacity is determined as 8096 MB (block 410, FIG. 4). The partitions 502, 504, 506, 508, and 512 are fixed-size partitions, because each has a predefined size in the partition information 500.

In order to calculate the size of the variable-size partitions (in this example, the single read-write file system partition 510) at block 430 (FIG. 4), the sizes of the fixed-size partitions 502, 504, 506, 508, 512 are summed, yielding 6022 MB (block 432, FIG. 4). By subtracting this sum from the memory capacity of the mass storage medium, the size of the read-write partition is determined to be 8096 MB−6022 MB=2074 MB (block 434, FIG. 4).

The variable-location secondary partition table partition 512 follows the variable-size read-write file system partition 510 in the order defined by the partition information 500. The calculated size of the read-write file system partition of 2074 MB is added to the starting block address 6021 MB of the read-write file system partition to determine the starting block address of the secondary partition table partition as 6021 MB+2074 MB=8095 MB.

The partition table content for the mass storage medium 650 is calculated in the same way. In this case of this 16 GB memory capacity medium 650, the size of the read-write partition is determined to be 16384 MB−6022 MB=10362

MB, and the starting block address of the secondary partition table partition as 6021 MB+10362 MB=16383 MB.

Figure 7:
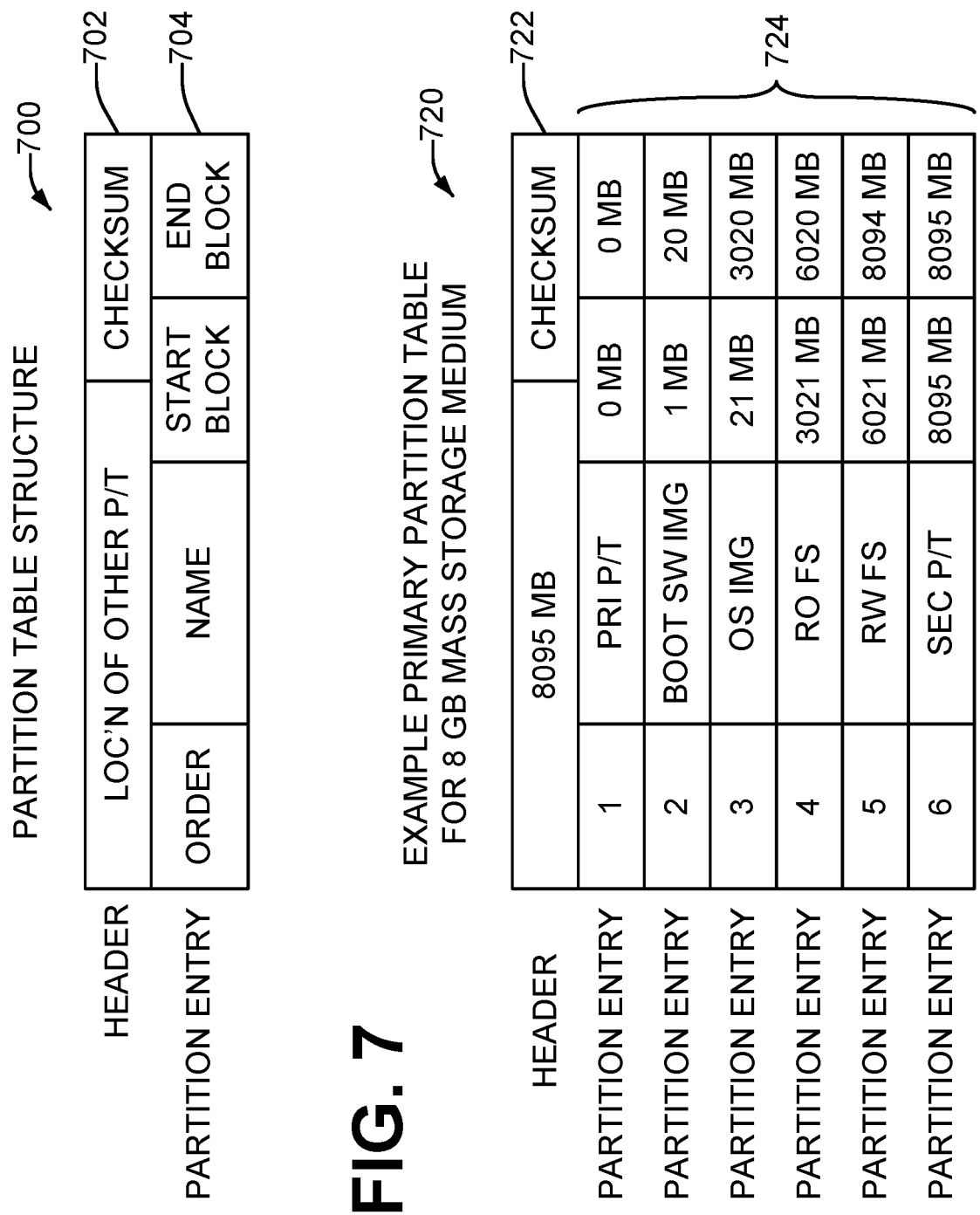
FIG. 7 is a schematic representation of an example partition table for a mass storage medium created using the partition information of FIG. 5 in accordance with an example of the present disclosure.

Considering now a partition table for a mass storage medium, and with reference to FIG. 7, one example partition table structure 700 includes header information 702 and one or more partition entries 704. The header information 702 may include a location of another partition table (in the case where redundant partition tables are included), a checksum usable to validate the contents of the partition table, and other information (not shown). Each partition entry 702 includes fields describing an order in the mass storage medium of the partition, a partition name or identifier, a starting block location, and an end block location (or alternatively a partition size). An example partition table 720 has partition table contents (header 722 and partition entries 724), in accordance with the partition table structure 700, which correspond to the primary partition table of the mass storage medium 600 (FIG. 6).

From the foregoing it will be appreciated that the computing device, methods, and computer-readable medium provided by the present disclosure represent a significant advance in the art. Although several specific examples have been described and illustrated, the disclosure is not limited to the specific methods, forms, or arrangements of parts so described and illustrated. This description should be understood to include all combinations of elements described herein, and claims may be presented in this or a later application to any combination of these elements. The foregoing examples are illustrative, and different features or elements may be included in various combinations that may be claimed in this or a later application. Unless otherwise specified, operations of a method claim need not be performed in the order specified. Similarly, blocks in diagrams or numbers should not be construed as operations that proceed in a particular order. Additional blocks/operations may be added, some blocks/operations removed, or the order of the blocks/operations altered and still be within the scope of the disclosed examples. Further, methods or operations discussed within different figures can be added to or exchanged with methods or operations in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element or the equivalent thereof, such claims should be understood to include incorporation of at least one such element, neither requiring nor excluding two or more such elements. Where the claims recite "having", the term should be understood to mean "comprising".

What is claimed is:

1. A computing device, comprising:
  a processor;
  a mass storage medium, coupled to the processor, having a pre-installed operating system but no pre-installed partition table; and
  boot software executable by the processor from a memory to generate and store the partition table on the mass storage medium for use by the operating system;
  wherein the generated partition tables identifies partitions of the mass storage medium, including a variable-size partition and a variable-location position, wherein the partition table is generated based at least in part on a memory capacity of the medium, where the partitions are non-overlapping.

2. The computing device of claim 1, wherein the boot software is further to load into the memory, and then launch, the operating system.

3. The computing device of claim 1, wherein the boot software is further to generate and store the partition table on the mass storage medium the first time the computer is booted.

4. The computing device of claim 1, wherein the boot software is further to determine whether the partition table is prestored on the mass storage medium and, if so, omit generating and storing the partition table on the mass storage medium.

5. The computing device of claim 1, wherein the mass storage medium has a particular memory capacity, and wherein the boot software is further to generate the partition table so as to maximize, based at least in part on the memory capacity, a memory size of a read-write partition on the medium.

6. The computing device of claim 1, wherein generating and storing the partition table neither modifies nor relocates on the medium any files of the operating system.

7. The computing device of claim 1, wherein generating and storing the partition table neither resizes nor relocates on the medium any partitions having pre-installed software.

8. The computing device of claim 1, wherein the mass storage device is an eMMC flash memory.

9. The computing device of claim 1, wherein the partition table is generated by the boot software
  determining a memory capacity of the mass storage medium,
  calculating a size of the variable-size partition, based on the memory capacity and on predefined sizes of all fixed-size partitions of the mass storage medium,
  assigning a location on the mass storage medium to all the variable-location partition, based at least in part on the calculated size of the variable-size partition and a predefined partition order, and
  constructing content of the partition table based on the sizes and locations of the fixed-size partitions, the variable-size partition, and the variable-location partition.

10. A method of booting a computing device, comprising:
  loading boot software from a mass storage medium that has a pre-installed operating system but no pre-installed partition table usable by the operating system to access information on the mass storage medium;
  creating the partition table to define partitions of the mass storage medium, including a variable-size partition and a variable-location partition, based at least in part on a memory capacity of the medium, wherein all the partitions are non-overlapping; and
  writing the partition table to the mass storage medium for use by the operating system to access information on the mass storage medium.

11. The method of claim 10, comprising:
  launching the operating system after the writing the partition table.

12. The method of claim 10, comprising:
  determining if the partition table exists on the mass storage medium;
  and wherein the creating and the writing are performed if the partition table does not exist on the mass storage medium.

13. The method of claim 10, comprising:
performing the creating and the writing the first time the computing device is booted but not at subsequent times the computing device is booted.

14. The method of claim 10, wherein the creating comprises:
determining a memory capacity of the mass storage medium;
calculating a size of a variable-size partition, based on the memory capacity and on predefined sizes of all fixed-size partitions of the mass storage medium;
assigning a location on the mass storage medium to a variable-location partition, based at least in part on the calculated size of the variable-size partition and a predefined partition order; and
constructing content of the partition table based on the sizes and locations of media-size-independent partitions and the read-write partition.

15. The method of claim 10, wherein the creating and the writing preserves a size and a location on the mass storage medium of partitions having pre-installed software.

16. The method of claim 10, wherein the loading, creating, and writing are performed by the computer without involvement of any external computer.

17. A non-transitory computer-readable mass storage medium having an executable boot program stored thereon, wherein the boot program instructs a processor to:
determine a memory capacity of the mass storage medium, wherein the mass storage medium also includes a pre-installed operating system but no pre-installed partition table usable by the operating system to access information on the mass storage medium;
create a partition table to define partitions of the mass storage medium, including a variable-size paritions and a variable-location partition, based at least in part on a memory capacity of the mass storage medium, wherein all the partitions are non-overlapping;
write the partition table to the mass storage medium for use by the operating system to access information on the mass storage medium; and
transfer control to the pre-installed operating system after the partition table has been written to the mass storage medium.

18. The medium of claim 17, wherein the program further instructs the processor to:
determine whether the partition table exists on the mass storage medium; and
if the partition table exists on the mass storage medium, transfer control to the pre-installed operating system without creating and writing the partition table.

19. The medium of claim 17, wherein to create the partition table the program further instructs the processor to:
define a read-write partition of the mass storage device having a size equal to the memory capacity of the mass storage medium less a sum of the sizes of all other partitions of the mass storage medium.

20. The medium of claim 17, wherein to create the partition table the boot program instructs the processor to;
determine a memory capacity of the mass storage medium;
calculate a size of a variable-size partition, based on the memory capacity and on predefined sizes of all fixed-size partitions of the mass storage medium;
assign a location on the mass storage medium to a variable-location partition, based at least in part on the calculated size of the variable-size partition and a predefined partition order; and
construct content of the partition table based on the sizes and locations of the fixed-size partitions, the variable-size partition, and the variable-location partition.

21. A method of booting a computing device, comprising:
loading boot software from a mass storage medium that has a pre-installed operating system but no pre-installed partition table usable by the operating system to access information on the mass storage medium;
creating the partition table based at least in part on a memory capacity of the medium by
determining a memory capacity of the mass storage medium,
calculating a size of a variable-size partition, based on the memory capacity and on predefined sizes of all fixed-size partitions of the mass storage medium,
assigning a location on the mass storage medium to a variable-location partition, based at least in part on the calculated size of the variable-size partition and a predefined partition order, and
constructing content of the partition table based on the sizes and locations of the fixed-size partitions, the variable-size partition, and the variable-location partition; and writing the partition table to the mass storage medium.

22. The method of claim 21, wherein the calculating comprises:
adding the sizes of the fixed-size partitions to form a sum; and
subtracting the sum from the memory capacity to calculate the size of the variable-size partition.

23. The method of claim 22, wherein the assigning comprises:
adding the calculated size of the variable-size partition to a location of the variable-size partition to determine the location of the variable-location partition, wherein the variable-location partition follows the variable-size partition in the predefined partition order.

* * * * *